(12) United States Patent
Yang et al.

(10) Patent No.: US 11,237,681 B2
(45) Date of Patent: Feb. 1, 2022

(54) INPUT SENSING PANEL AND DISPLAY APPARATUS INCLUDING THE SAME

(71) Applicant: Samsung Display Co., Ltd., Yongin-Si (KR)

(72) Inventors: Sung-Jin Yang, Cheonan-si (KR); Hyunsik Park, Cheonan-si (KR); Chungi You, Asan-si (KR); Kicheol Kim, Yongin-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 17/017,775

(22) Filed: Sep. 11, 2020

(65) Prior Publication Data

US 2021/0191566 A1 Jun. 24, 2021

(30) Foreign Application Priority Data

Dec. 19, 2019 (KR) ........................ 10-2019-0170344

(51) Int. Cl.
*G06F 3/044* (2006.01)
(52) U.S. Cl.
CPC .......... *G06F 3/0445* (2019.05); *G06F 3/0446* (2019.05); *G06F 2203/04111* (2013.01)
(58) Field of Classification Search
CPC ................. G06F 3/0445; G06F 3/0446; G06F 2203/04105; G06F 2203/04111
See application file for complete search history.

(56) References Cited

U.S. PATENT DOCUMENTS

| 10,109,704 | B2 | 10/2018 | Shin et al. |
| 2011/0057893 | A1 | 3/2011 | Kim et al. |
| 2019/0235702 | A1* | 8/2019 | Wang .................... G06F 3/0443 |

FOREIGN PATENT DOCUMENTS

| KR | 10-1082293 B1 | 11/2011 |
| KR | 10-2017-0114029 A | 10/2017 |
| KR | 10-2009806 B1 | 8/2019 |

\* cited by examiner

*Primary Examiner* — Deeprose Subedi
(74) *Attorney, Agent, or Firm* — Innovation Counsel LLP

(57) ABSTRACT

An input sensing panel includes a base layer, a plurality of sensing electrodes arranged in a first direction and a second direction which cross each other in an insulating manner, and a plurality of sensing lines connected to a plurality of respective sensing electrodes, at least one of the plurality of sensing lines including a diagonal portion extending in a direction diagonal to each of the first direction and the second direction. Here, each of the plurality of sensing lines includes a lower layer disposed on the base layer and containing a first conductive material and an upper layer containing a second conductive material different from the first conductive material and contacting the lower layer, and the upper layer disposed in the diagonal portion is disconnected in the diagonal direction to expose a portion of the lower layer.

20 Claims, 12 Drawing Sheets

INPUT SENSING PANEL AND DISPLAY APPARATUS INCLUDING THE SAME

CROSS-REFERENCE TO RELATED APPLICATIONS

This U.S. non-provisional patent application claims priority under 35 U.S.C. § 119 to Korean Patent Application No. 10-2019-0170344, filed on Dec. 19, 2019, the entire contents of which are hereby incorporated by reference.

BACKGROUND

The present disclosure herein relates to a display apparatus including an input sensing panel, and more particularly, to a display apparatus having improved reliability.

A display apparatus may include a display panel for displaying an image and an input sensing panel for detecting an external input. The input sensing panel may be integrated with the display panel through a continuous process. Alternatively, the input sensing panel may be provided through a separated process from the display panel, and then coupled to the display panel.

SUMMARY

The present disclosure provides a display apparatus having improved reliability by including an input sensing panel blocking moisture introduced from the outside.

An embodiment of the inventive concept provides an input sensing panel including: a base layer including an active area and a peripheral area disposed adjacent to the active area; a plurality of sensing electrodes disposed on the base layer in the active area and arranged in a first direction and a second direction which cross each other in an insulating manner; and a plurality of sensing lines disposed in the peripheral area and connected to a plurality of respective sensing electrodes, at least one of the plurality of sensing lines comprising a diagonal portion extending in a direction diagonal to each of the first direction and the second direction. Here, each of the plurality of sensing lines comprises a lower layer disposed on the base layer and containing a first conductive material, and an upper layer containing a second conductive material different from the first conductive material and contacting the lower layer, and the upper layer disposed in the diagonal portion is disconnected in the diagonal direction to expose a portion of the lower layer.

In an embodiment, the input sensing panel may include: a first conductive layer comprising one portion of the plurality of sensing electrodes and the lower layer, and containing the same material as the first conductive material; a first sensing insulation layer covering the first conductive layer and in which a plurality of contact holes are defined; and a second conductive layer comprising the other portion of the plurality of sensing electrodes and the upper layer, and containing the same material as the second conductive material.

In an embodiment, the first conductive material may include a transparent conductive oxide and the second conductive material may include metal.

In an embodiment, the plurality of sensing electrodes may include: a first sensing electrode comprising a plurality of first sensing patterns arranged in the first direction and a plurality of first connection patterns configured to connect the plurality of first sensing patterns; and a second sensing electrode comprising a plurality of second sensing patterns arranged in the second direction and a plurality of second connection patterns configured to connect the plurality of second sensing patterns. Here, the plurality of first sensing patterns, the plurality of second sensing patterns, and the plurality of second connection patterns may be formed of the first conductive layer, and the plurality of first connection patterns are formed of the second conductive layer. Also, the plurality of first connection patterns may be connected to the plurality of first sensing patterns through the contact holes.

In an embodiment, the first sensing electrode may include first interconnection patterns extending from the plurality of first sensing patterns disposed adjacent to the peripheral area among the plurality of first sensing patterns and connected to a plurality of corresponding sensing lines, and the second sensing electrode may include second interconnection patterns extending from the plurality of second sensing patterns disposed adjacent to the peripheral area among the plurality of second sensing patterns and connected to a plurality of corresponding sensing lines.

In an embodiment, the diagonal portion of each of the plurality of sensing lines may face a corner of one of the first interconnection patterns and the second interconnection patterns.

In an embodiment, the upper layer disposed in the diagonal portion may have a plurality of disconnected portions.

In an embodiment, a length of the diagonal portion of each of the plurality of sensing lines may gradually decrease in a direction away from the plurality of sensing electrodes.

In an embodiment, the upper layer may cover the lower layer.

In an embodiment, the base layer may include glass.

In an embodiment of the inventive concept, a display apparatus includes: a display panel; and an input sensing panel disposed on the display panel and divided into an active area and a peripheral area adjacent to the active area. Here, the input sensing panel includes: a base layer; a plurality of sensing electrodes disposed on the base layer in the active area and arranged in a first direction and a second direction which cross each other in an insulating manner; and a plurality of sensing lines disposed in the peripheral area and connected to a plurality of respective sensing electrodes, at least one of the plurality of sensing lines comprising a diagonal portion extending in a direction diagonal to each of the first direction and the second direction. Also, each of the plurality of sensing lines includes a lower layer disposed on the base layer and containing a first conductive material and an upper layer containing a second conductive material different from the first conductive material and contacting the lower layer, and the upper layer disposed in the diagonal portion is disconnected in the diagonal direction to expose a portion of the lower layer.

In an embodiment, the input sensing panel may include: a first conductive layer including one portion of the plurality of sensing electrodes and the lower layer and containing the same material as the first conductive material; a first sensing insulation layer covering the first conductive layer and in which a plurality of contact holes are defined; and a second conductive layer including the other portion of the plurality of sensing electrodes and the upper layer and containing the same material as the second conductive material.

In an embodiment, the first conductive material may include a transparent conductive oxide and the second conductive material may include metal.

In an embodiment, the plurality of sensing electrodes may include: a first sensing electrode including a plurality of first sensing patterns arranged in the first direction and a plurality of first connection patterns configured to connect the plurality of sensing patterns; and a second sensing electrode including a plurality of second sensing patterns arranged in the second direction and a plurality of second connection patterns configured to connect the plurality of sensing patterns. Here, the plurality of first sensing patterns, the plurality of second sensing patterns, and the plurality of second connection patterns may be formed of the first conductive layer, and the first connection patterns may be formed of the second conductive layer. Also, the plurality of first connection patterns may be connected to the plurality of first sensing patterns through the contact holes.

In an embodiment, the first sensing electrode may include first interconnection patterns extending from the plurality of first sensing patterns disposed adjacent to the peripheral area among the plurality of first sensing patterns and connected to a plurality of corresponding sensing lines, and the second sensing electrode may include second interconnection patterns extending from the plurality of second sensing patterns disposed adjacent to the peripheral area among the plurality of second sensing patterns and connected to a plurality of corresponding sensing lines.

In an embodiment, the diagonal portion of each of the sensing lines may face a corner of one of the plurality of first interconnection patterns and the second interconnection patterns.

In an embodiment, the upper layer disposed in the diagonal portion may have a plurality of disconnected portions.

In an embodiment, a length of the diagonal portion of each of the plurality of sensing lines may gradually decrease in a direction away from the plurality of sensing electrodes.

In an embodiment, the upper layer may cover the lower layer.

In an embodiment, the base layer may include glass.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
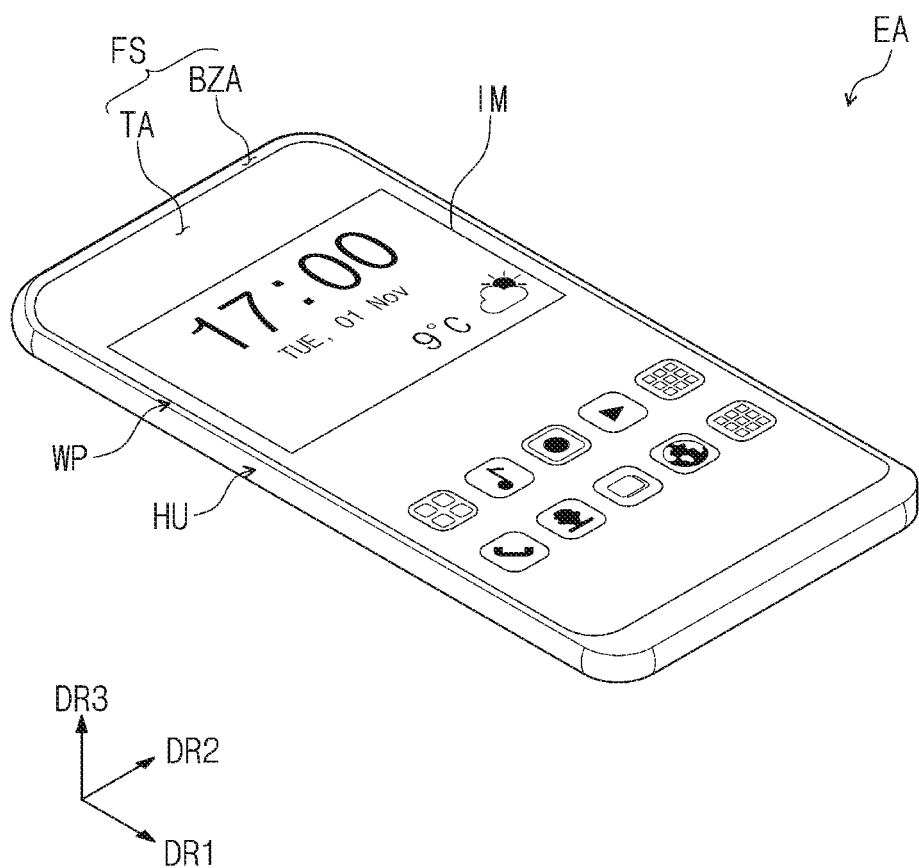
FIG. 1 is a perspective view illustrating a display apparatus according to an embodiment of the inventive concept.

In this specification, it will also be understood that when one component (or region, layer, portion) is referred to as being 'on', 'connected to', or 'coupled to' another component, it can be directly disposed/connected/coupled on/to the one component, or an intervening third component may also be present.

Like reference numerals refer to like elements throughout. Also, in the figures, the thickness, ratio, and dimensions of components are exaggerated for clarity of illustration.

The term "and/or" includes any and all combinations of one or more of the associated listed items.

It will be understood that although the terms such as 'first' and 'second' are used herein to describe various elements, these elements should not be limited by these terms. The terms are only used to distinguish one component from other components. For example, a first element referred to as a first element in one embodiment can be referred to as a second element in another embodiment without departing from the scope of the appended claims. The terms of a singular form may include plural forms unless referred to the contrary.

Also, "under", "below", "above', "upper", and the like are used for explaining relation association of components illustrated in the drawings. The terms may be a relative concept and described based on directions expressed in the drawings.

Unless otherwise defined, all terms (including technical and scientific terms) used herein have the same meaning as generally understood by those skilled in the art. Terms as defined in a commonly used dictionary should be construed as having the same meaning as in an associated technical context, and unless defined apparently in the description, the terms are not ideally or excessively construed as having formal meaning.

The meaning of 'include' or 'comprise' specifies a property, a fixed number, a step, an operation, an element, a component or a combination thereof, but does not exclude other properties, fixed numbers, steps, operations, elements, components or combinations thereof. Hereinafter, embodiments of the inventive concept will be described with reference to the accompanying drawings.

Figure 2:
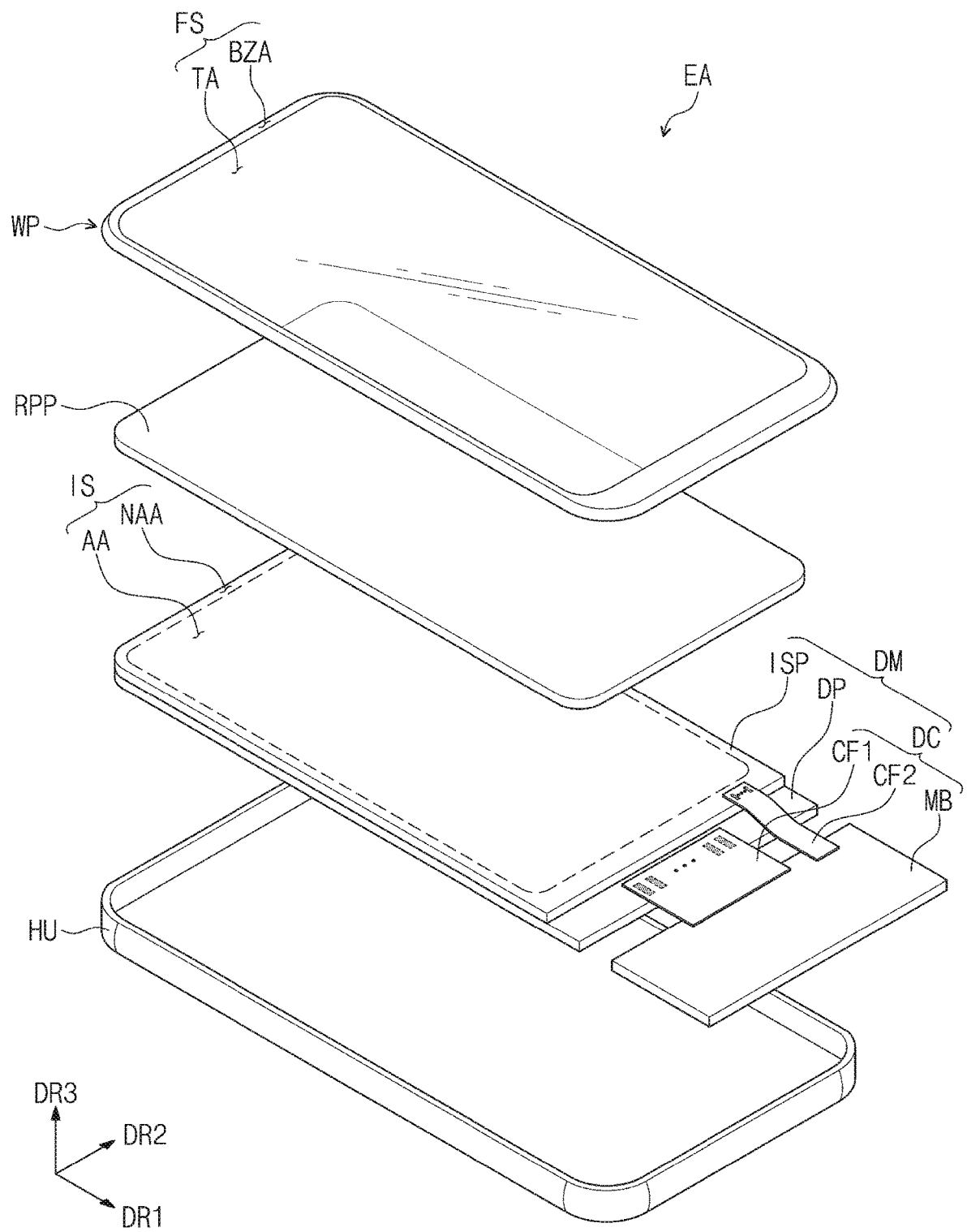
FIG. 2 is an exploded perspective view illustrating the display apparatus according to an embodiment of the inventive concept.

FIG. 1 is a perspective view illustrating a display apparatus according to an embodiment of the inventive concept. FIG. 2 is an exploded perspective view illustrating the display apparatus according to an embodiment of the inventive concept.

Referring to FIGS. 1 and 2, a display apparatus EA may be activated according to an electrical signal. The display apparatus EA may include various embodiments. For example, the display apparatus EA may be used for large-sized electronic devices such as televisions, monitors, or outdoor advertisement boards and small and medium-sized electronic devices such as personal computers, notebook computers, personal digital terminals, navigation units for vehicles, game consoles, portable electronic devices, and cameras. Also, the above-described devices are exemplified as merely exemplary embodiments, and thus, may be adopted for other display apparatuses unless departing from the spirit and scope of the invention. In the embodiment, a smartphone is illustrated as an example of the display apparatus EA.

The display apparatus EA may display an image IM in a third direction DR3 on a display surface FS in parallel to each of a first direction DR1 and a second direction DR2. The image IM may include a still image as well as a video. In FIG. 1, a clock window and icons are illustrated as an example of the image IM. The display surface FS on which the image IM is displayed may correspond to each of a front surface of the display apparatus EA and a front surface of a window panel WP.

In the embodiment, a front surface (or top surface) and a rear surface (or bottom surface) of each of members are defined on the basis of a direction of displaying the image IM. The front surface and the rear surface may be opposite to each other in the third direction DR3, and a normal direction of each of the front surface and the rear surface may be parallel to the third direction DR3. Here, directions indicated by the first to third directions DR1, DR2, and DR3, as relative concepts, may be converted with respect to each other. In this specification, an expression "on a plane" may represent a feature of viewing in the third direction DR3.

The display apparatus EA may include a window panel WP, an anti-reflection panel RPP, a display module DM, and a housing HU. In the embodiment, the window panel WP and the housing HU may be coupled to provide an appearance of the display apparatus EA.

The window panel WP may include an optically transparent insulating material. For example, the window panel WP may include glass or plastic. The window panel WP may have a single-layer or multi-layer structure. For example, the window panel WP may include a plurality of plastic films coupled by an adhesive or a glass substrate and a plastic film coupled by an adhesive.

The display surface FS of the window panel WP may be the front surface of the display apparatus EA. A transmission area TA may be an optically transparent area. For example, the transmission area TA may have a visible light transmittance of about 90% or more.

A bezel area BZA may have a relatively lower light transmittance than that of the transmission area TA. The bezel area BZA defines a shape of the transmission area TA. The bezel area BZA may be adjacent to the transmission area TA to surround the transmission area TA.

The bezel area BZA may have a predetermined color. The bezel area BZA may cover a peripheral area NAA of the display module DM to block the peripheral area NAA from being seen from the outside. However, the embodiment of the inventive concept is not limited thereto. For example, the bezel area BZA may be exist in the window panel WP.

The anti-reflection panel RPP may be disposed below the window panel WP. The anti-reflection panel RPP may reduce a reflectance of external light incident from an upper side of the window panel WP. The anti-reflection panel RPP according to an embodiment of the inventive concept may be omitted, or may be contained in the display module DM.

The display module DM may display the image IM and detect an external input. The display module DM may include a front surface IS including an active area AA and a peripheral area NAA. The active area AA may be activated according to an electric signal.

In the embodiment, the active area AA may be an area on which the image IM is displayed and an external input is detected at the same time. The transmission area TA may overlap at least a portion of the active area AA. For example, the transmission area TA overlaps a front surface or at least a portion of the active area AA. Thus, a user may watch the image IM or provide an external input through the transmission area TA. However, this is merely an example. In the active area AA of the display module DM according to an embodiment of the inventive concept, an area on which the image IM is displayed and an area in which the external input is detected may be separated from each other. However, the embodiment of the inventive concept is not limited thereto.

The peripheral area NAA may be covered by the bezel area BZA. The peripheral area NAA is disposed adjacent to the active area AA. The peripheral area NAA may surround the active area AA. A driving circuits or lines for driving the active area AA may be disposed on the peripheral area NAA.

The display module DM may include a display panel DP, an input sensing panel ISP, and a driving circuit DC.

The display panel DP may be a component that substantially generates the image IM. The image IM generated by the display panel DP may be seen to the user through the transmission area TA.

The input sensing panel ISP may detect an external input applied from the outside. As described above, the input sensing panel ISP may detect an external input provided to the window panel WP.

The external input may include various types of inputs provided from the outside of the display apparatus EA. The external input applied from the outside may have various types. For example, the input may include contact that is generated by a portion of a human body such as user's hands and an external input (e.g., hovering) that is applied by being approached to or being adjacent by a predetermined distance to the display apparatus EA. Also, the external input may have various types such as force, pressure, and light. However, the embodiment of the inventive concept is not limited thereto.

The driving circuit DC may be electrically connected to the display panel DP and the input sensing panel ISP. The driving circuit DC may include a main circuit board MB, a first circuit board CF1, and a second circuit board CF2.

The first circuit board CF1 may be electrically connected to the display panel DP. The first circuit board CF1 may connect the display panel DP and the main circuit board MB. The first circuit board CF1 according to the embodiment is illustrated as a flexible circuit film. However, the embodiment of the inventive concept is not limited thereto. For example, the first circuit board CF1 according to an embodiment of the inventive concept may not be connected to the main circuit board MB and may be a rigid board.

The first circuit board CF1 may be connected to pads (display pads) of the display panel DP, which are disposed on the peripheral area NAA. The first circuit board CF1 may provide an electrical signal for driving the display panel DP to the display panel DP. The electrical signal may be generated in the first circuit board CF1 or in the main circuit board MB.

The second circuit board CF2 may be electrically connected to the input sensing panel ISP. The second circuit board CF2 may connect the input sensing panel ISP and the main circuit board MB. The second circuit board CF2 according to the embodiment is illustrated as a flexible circuit film. However, the embodiment of the inventive concept is not limited thereto. For example, the second circuit board CF2 according to an embodiment of the inventive concept may not be connected to the main circuit board MB and may be a rigid board.

The second circuit board CF2 may be connected to pads (sensing pads) of the input sensing panel ISP which are disposed on the peripheral area NAA. The second circuit board CF2 may provide an electrical signal for driving the input sensing panel ISP to the input sensing panel ISP. The electrical signal may be generated in the second circuit board CF2 or in the main circuit board MB.

The main circuit board MB may include all sorts of driving circuits for driving the display module DM or a connector for power supply. Each of the first circuit board CF1 and second circuit board CF2 may be connected to the main circuit board MB. The display module DM according to an embodiment of the inventive concept may be easily controlled by one main circuit board MB. However, this is merely an example. For example, in the display module DM according to an embodiment of the inventive concept, the display panel DP and the input sensing panel ISP may be connected to different main circuit boards, and one of the first circuit board CF1 and the second circuit board CF2 may not be connected to the main circuit board MB. However, the embodiment of the inventive concept is not limited thereto.

The housing HU may be coupled with the window panel WP. The housing HU may be coupled with the window panel WP to provide a predetermined inner space. The display module DM may be accommodated in the inner space.

The housing HU may include a material having a relatively high rigidity. For example, the housing HU may include glass, plastic, or metal, or a plurality of frames and/or plates made of a combination thereof. The housing HU may safely protect components of the display apparatus EA, which are accommodated in the inner space, from an external impact.

Figure 3A:
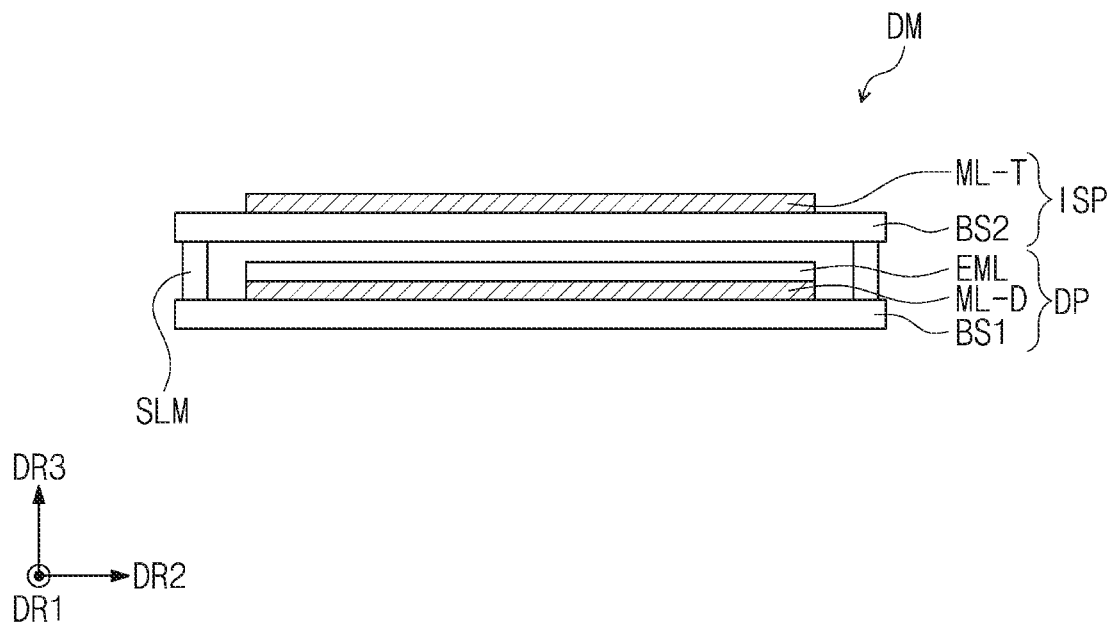
FIG. 3A is a cross-sectional view illustrating a display module according to an embodiment of the inventive concept.

FIG. 3A is a cross-sectional view illustrating the display module according to an embodiment of the inventive concept. FIG. 3 is a cross-sectional view illustrating a display module according to an embodiment of the inventive concept. The same or similar components as those in FIGS. 1 and 2 will be designated by the same or similar reference numerals, respectively, and overlapped description thereof will be omitted.

Referring to FIG. 3A, the display module DM may include a display panel DP, an input sensing panel ISP, and a driving circuit DC.

The display panel DP may include a first base layer BS1, a display circuit layer ML-D, and an image realization layer EML. The input sensing panel ISP may include a second base layer BS2 and a sensing circuit layer ML-T.

Each of the first base layer BS1 and the second base layer BS2 may be a laminated structure including a silicon substrate, a plastic substrate, a glass substrate, an insulation film, or a plurality of insulation layers.

The display circuit layer ML-D may be disposed on the first base layer BS1. The display circuit layer ML-D may include a plurality of insulation layers, a plurality of conductive layers, and a semiconductor layer. The plurality of conductive layers of the display circuit layer ML-D may constitute signal lines or a control circuit of a pixel.

The image realization layer EML may be disposed on the display circuit layer ML-D. The image realization layer EML may include organic light emitting diodes. However, this is merely an example. For example, the image realization layer EML may include inorganic light emitting diodes, organic-inorganic light emitting diodes, or a liquid crystal layer.

The second base layer BS2 may be disposed on the image realization layer EML. A predetermined space may be defined between the second base layer BS2 and the image realization layer EML. The space may be filled with air or an inert gas. Also, in an embodiment of the inventive concept, the space may be filled with a filling material such as a silicon-based polymer, an epoxy-based resin, or an acrylic-based resin.

The sensing circuit layer ML-T may be disposed on the second base layer BS2. The sensing circuit layer ML-T may include a plurality of insulation layers and a plurality of conductive layers. The plurality of conductive layers may include sensing electrodes that detect an external input, sensing lines that are electrically connected to the sensing electrodes, and sensing pads that are electrically connected to the sensing lines. This will be described later.

A coupling member SLM may be disposed between the first base layer BS1 and the second base layer BS2. The coupling member SLM may couple the first base layer BS1 and the second base layer BS2. The coupling member SLM may include an organic material such as a photo-curable resin or a photo-setting resin or an inorganic material such as a frit seal. However, the embodiment of the inventive concept is not limited thereto.

Figure 3B:
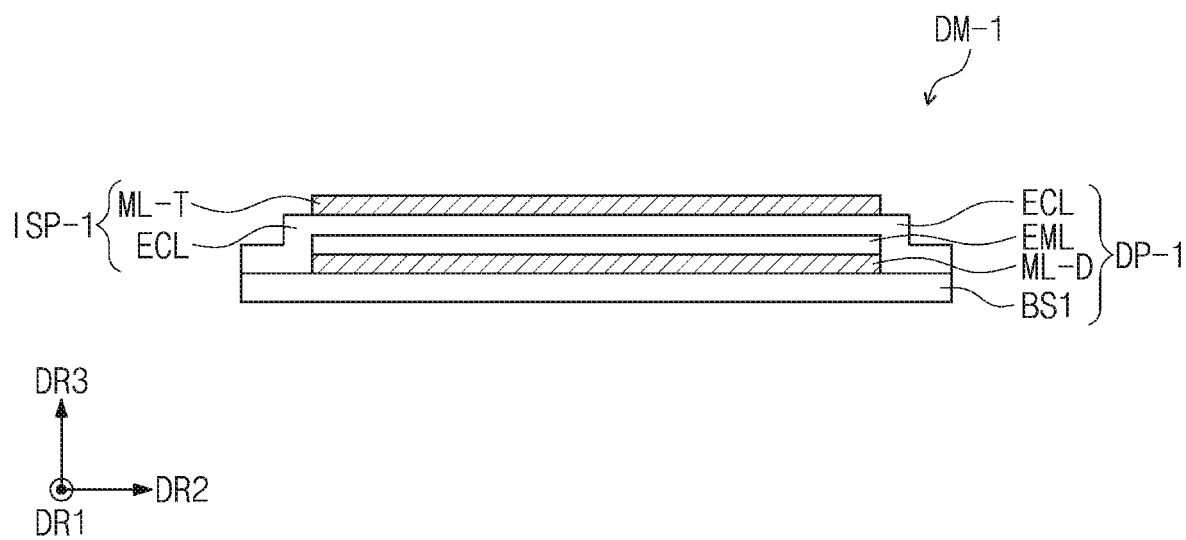
FIG. 3B is a cross-sectional view illustrating a display module according to an embodiment of the inventive concept.

Referring to FIG. 3B, a display module DM-1 may include a display panel DP-1 and an input sensing panel ISP-1. The input sensing panel ISP-1 may be referred to as an input sensing layer.

The display panel DP-1 may include a first base layer BS1, a display circuit layer ML-D, an image realization layer EML, and a thin-film encapsulation layer ECL. The input sensing panel ISP-1 may include a second base layer ECL and a sensing circuit layer ML-T. The thin-film encapsulation layer ECL and the second base layer ECL may be the same component.

The thin-film encapsulation layer ECL may seal the image realization layer EML to block moisture and oxygen introduced to the image realization layer EML from the outside. The thin-film encapsulation layer ECL may include an organic layer and a plurality of inorganic layers sealing the organic layer.

According to an embodiment of the inventive concept, the display panel DP-1 and the input sensing panel ISP-1 may be provided through a continuous process. That is, the sensing circuit layer ML-T may be provided directly on the thin-film encapsulation layer ECL.

Figure 4:
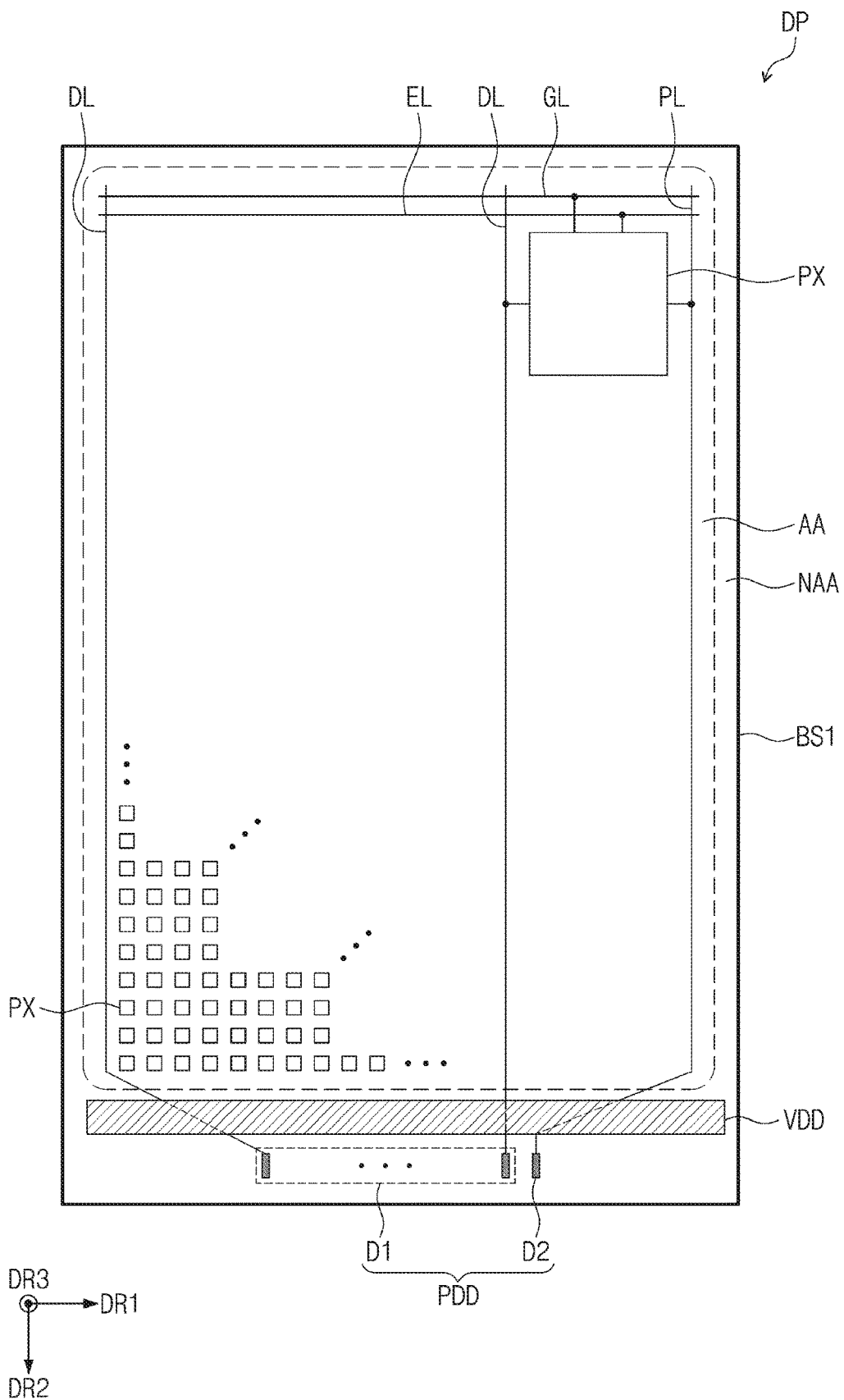
FIG. 4 is a plan view illustrating a display panel according to an embodiment of the inventive concept.

FIG. 4 is a plan view illustrating the display panel according to an embodiment of the inventive concept. The same or similar components as those in FIGS. 1 and 3B will be designated by the same or similar reference numerals, respectively, and overlapped description thereof will be omitted.

Referring to FIG. 4, the display panel DP may include a plurality of pixels PX, a plurality of signal lines GL, DL, PL, and EL, and a plurality of display pads PDD.

The display panel DP may have an active area AA on which an image is displayed and a peripheral area NAA on which a driving circuit or a driving line is disposed. In FIG. 4, the active area AA and the peripheral area NAA of the display panel DP are illustrated. The plurality of pixels PX may be disposed on the active area AA.

The plurality of signal lines GL, DL, PL, and EL may be connected to the pixels PX and transmit an electrical signal to the pixels PX. A scan line GL, a data line DL, a power line PL, and a light emitting control line EL are exemplarily illustrated among the signal lines contained in the display panel DP. However, this is merely an example. Although the signal lines GL, DL, PL, and EL according to an embodiment of the inventive concept may further include an initialization voltage line, the embodiment of the inventive concept is not limited thereto.

A power pattern VDD may be disposed on the peripheral area NAA. The power pattern VDD may be connected to a plurality of power lines PL. Thus, the display panel DP may provide the same first power signal to the plurality of pixels by including the power pattern VDD.

The display pads PDD may include a first pad D1 and a second pad D2. The first pad D1 may be provided in plurality, and the plurality of first pads D1 may be connected to the data lines DL, respectively. The second pad D2 may be connected to the power pattern VDD and electrically connected to the power line PL. The display panel DP may provide electrical signals, which are provided from the outside, to the pixels PX through the display pads PDD. The display pads PDD may further include pads for receiving other electrical signals in addition to the first pad D1 and the second pad D2. However, the embodiment of the inventive concept is not limited thereto.

Figure 5:
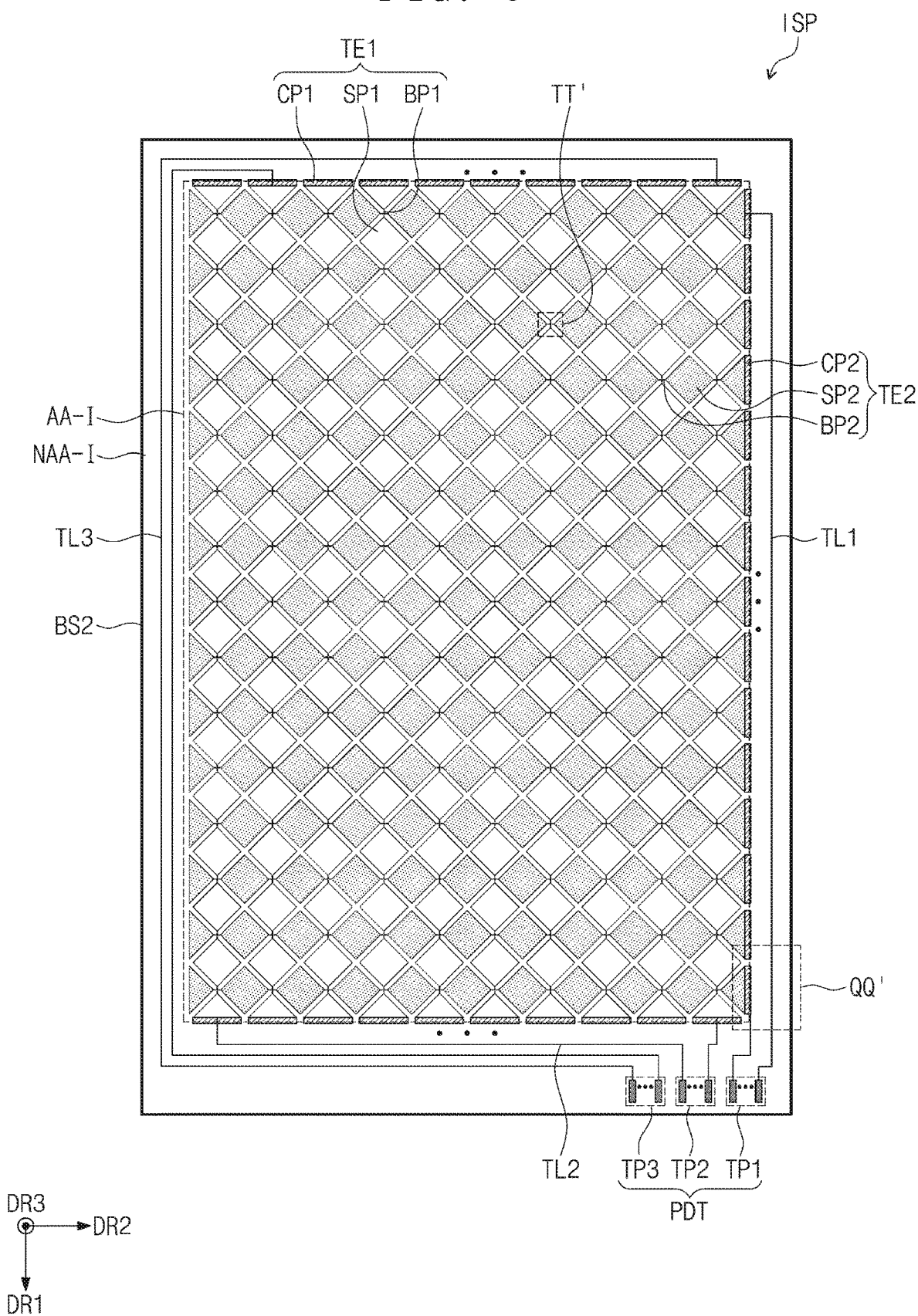
FIG. 5 is a plan view illustrating an input sensing panel according to an embodiment of the inventive concept.
Figure 6A:
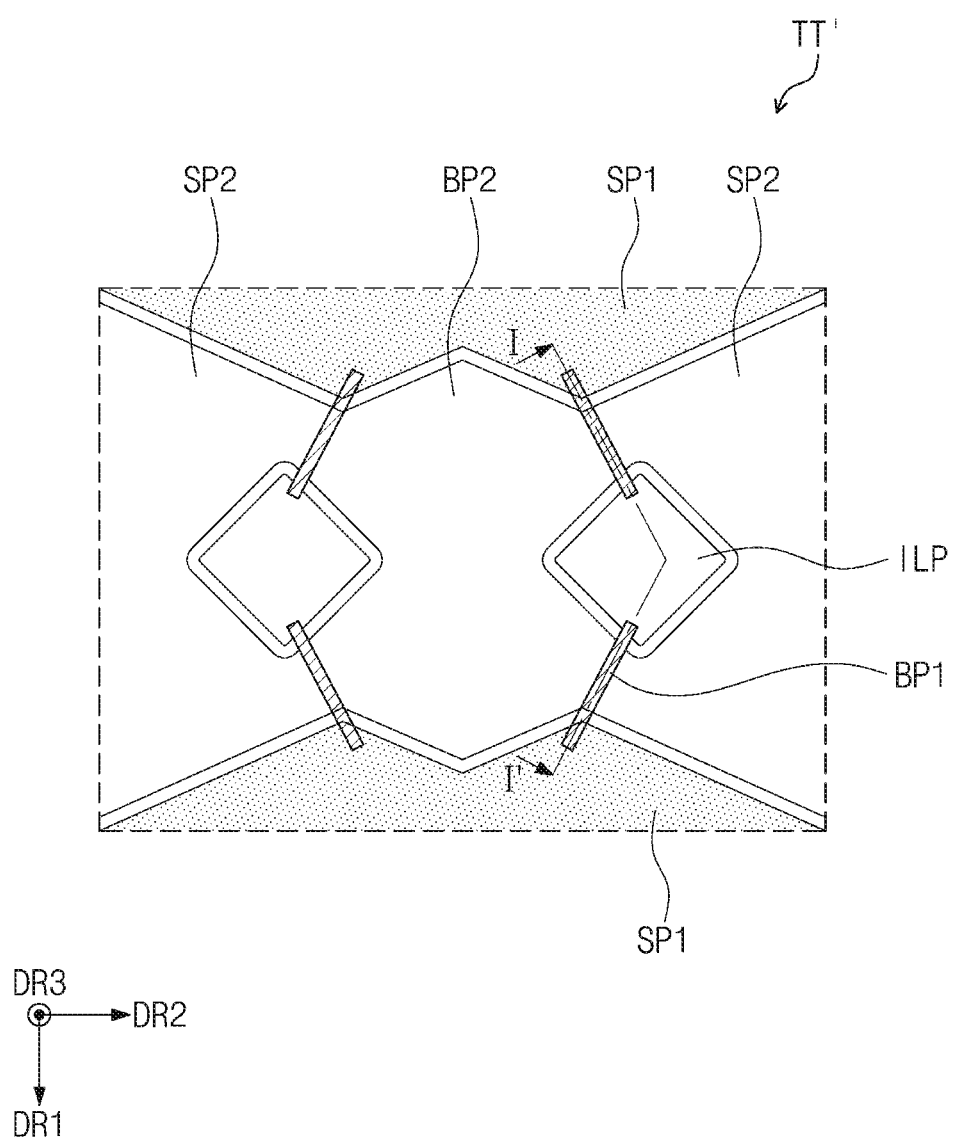
FIG. 6A is an enlarged view illustrating a portion TT' in FIG. 5.
Figure 6B:
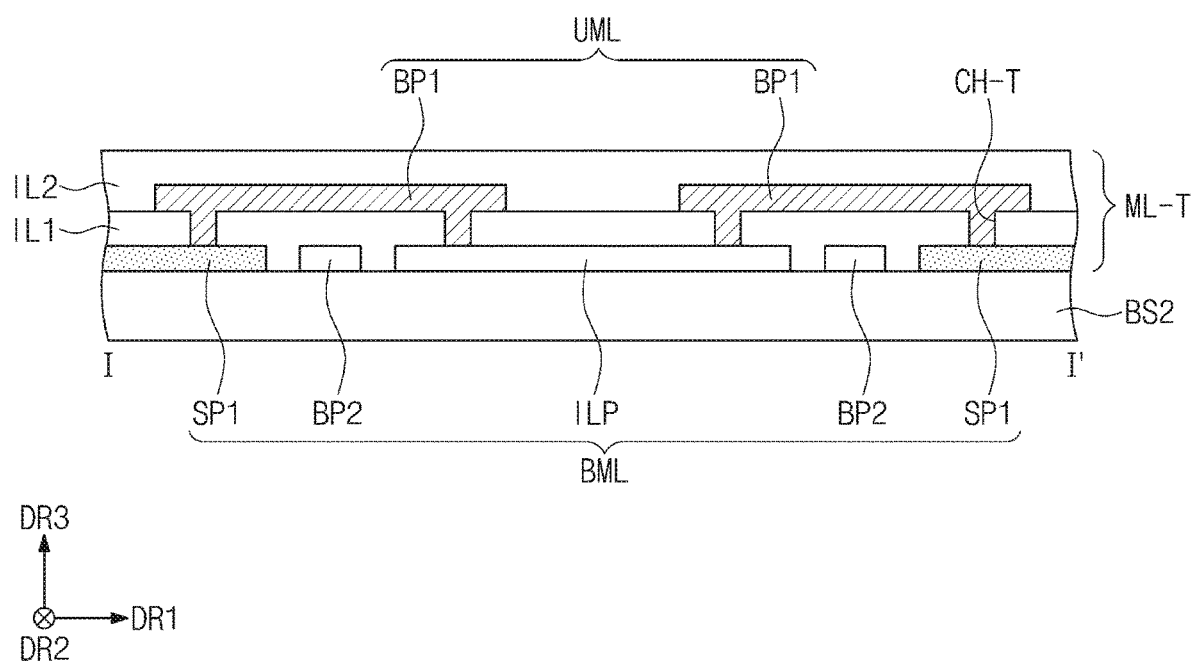
FIG. 6B is a cross-sectional view taken along line I-I' of FIG. 6A.

FIG. 5 is a plan view illustrating the input sensing panel according to an embodiment of the inventive concept. FIG. 6A is an enlarged plan view illustrating an area TT' in FIG. 5. FIG. 6B is a cross-sectional view taken along line I-I' of FIG. 6A. The same or similar components as those in FIGS. 1 and 4 will be designated by the same or similar reference numerals, respectively, and overlapped description thereof will be omitted.

Referring to FIG. 5, the input sensing panel ISP may include a second base layer BS2, a plurality of sensing electrodes TE1 and TE2, a plurality of sensing lines TL1, TL2, and TL3, and a plurality of sensing pads PDT. The plurality of sensing electrodes TE1 and TE2, the plurality of sensing lines TL1, TL2, and TL3, and the plurality of sensing pads PDT may constitute the sensing circuit layer ML-T (refer to FIG. 3).

The second base layer BS2 may be include an active area AA-I and a peripheral area NAA-I adjacent to the active area AA-I. The peripheral area NAA-I may surround the active area AA-I.

The plurality of sensing electrodes TE1 and TE2 may include a first sensing electrode TE1 and a second sensing electrode TE2. The first sensing electrode TE1 and the second sensing electrode TE2 may be disposed on the second base layer BS2 and overlap the active area AA-I. The input sensing panel ISP may obtain information of an external input through variation of a capacitance between the first sensing electrode TE1 and the second sensing electrode TE2.

The first sensing electrode TE1 may extend in the first direction DR1 and be arranged in the second direction DR2. The first sensing electrode TE1 may include first sensing patterns SP1, first connection patterns BP1, and first interconnection patterns CP1. The first sensing patterns SP1 may be arranged in the first direction DR1.

At least one first connection pattern BP1 may be connected to two mutually adjacent first sensing patterns SP1. Each of the first interconnection patterns CP1 may extend from the first sensing pattern SP1, which is closest to the peripheral area NAA-I, of the first sensing patterns SP1 contained in the first sensing electrode TEL Each of the second sensing lines TL2 and the third sensing lines TL3 may be connected to the corresponding first interconnection patterns CP1 and connected to the first sensing patterns SP1.

The second sensing electrode TE2 may extend in the second direction DR2 and be arranged in the first direction DR1. The second sensing electrode TE2 may include second sensing patterns SP2, second connection patterns BP2, and second interconnection patterns CP2. The second sensing patterns SP2 may be arranged in the second direction DR2.

At least one second connection pattern BP2 may be connected to two mutually adjacent second sensing patterns SP2. Each of the second interconnection patterns CP2 may extend from the second sensing pattern SP2, which is closest to the peripheral area NAA-I, of the second sensing patterns SP1 contained in the second sensing electrode TE2. Each of the first sensing lines TL1 may be connected to the corresponding second interconnection patterns CP2 and connected to the second sensing patterns SP2.

The sensing lines TL1, TL2, and TL3 may be disposed on the peripheral area NAA-I. The sensing lines TL1, TL2, and TL3 may include a first sensing line TL1, a second sensing line TL2, and a third sensing line TL3.

The first sensing line TL1 may be connected to the second sensing electrode TE2. The second sensing line TL2 may be connected to one end of the first sensing electrode TEL The third sensing line TL3 may be connected to the other end of the first sensing electrode TE1. The other end of the first sensing electrode TE1 may be opposite to the one end of the first sensing electrode TE1.

The first sensing electrode TE1 according to an embodiment of the inventive concept may be connected to the second sensing line TL2 and the third sensing line TL3. Thus, a sensitivity according to an area with respect to the first sensing electrode TE1 having a relatively greater length than the second sensing electrode TE2 may be uniformly maintained. However, this is merely an example. Although the third sensing line TL3 according to an embodiment of the inventive concept may be omitted, the embodiment of the inventive concept is not limited thereto.

The sensing pads PDT may be disposed on the peripheral area NAA-I. The sensing pads PDT may include a first sensing pad TP1, a second sensing pad TP2, and a third sensing pad TP3. The first sensing pad TP1 may be connected to the first sensing line TL1 and electrically connected to the first sensing electrode TE1. The second sensing pad TP2 may be connected to the second sensing line TL2. The third sensing pad TP3 may be connected to the third sensing line TL3. Thus, the second sensing pad TP2 and the third sensing pad TP3 may be electrically connected to the second sensing electrode TE2.

Referring to FIGS. 6A and 6B, the input sensing panel ISP (refer to FIG. 3A) may include a sensing circuit layer ML-T and a second base layer BS2. The sensing circuit layer ML-T may be disposed on the second base layer BS2.

The sensing circuit layer ML-T of the input sensing panel ISP may be defined by a first conductive layer BML, a first sensing insulation layer IL1 disposed on the first conductive layer BML, a second conductive layer UML disposed on the first sensing insulation layer IL1, and a second sensing insulation layer IL2 disposed on the second conductive layer UML.

The first conductive layer BML may include first sensing patterns SP1, second sensing patterns SP2, and second connection patterns BP2. Also, the first conductive layer BML may further include a floating pattern ILP. The floating pattern ILP may be insulated from the second sensing patterns SP2 and the second connection patterns BP2, and connected to the first sensing patterns SP1. Although not shown, the first conductive layer BML according to an embodiment of the inventive concept may include a lower layer, which will be described later, of the sensing lines TL1, TL2, and TL3 including a plurality of conductive layers.

The first conductive layer BML may include a transparent conductive material. In this specification, the transparent conductive material may be a material having a light transmittance equal to or greater than a predetermined reference value. For example, although the predetermined reference value is about 90%, the embodiment of the inventive concept is not limited thereto. The first conductive layer BML may include a transparent conductive oxide, e.g., at least one of an indium-zinc-oxide (IZO), an indium-tin oxide (ITO), an indium-gallium oxide (IGO), an indium-zinc-gallium oxide (IGZO), and a mixture/compound thereof. However, the embodiment of the inventive concept is not limited thereto.

The first conductive layer BML may include first sensing patterns SP1, second sensing patterns SP2, and second connection patterns BP2. Also, the first conductive layer BML may further include a floating pattern ILP. The floating pattern ILP may be insulated from the second sensing patterns SP2 and the second connection patterns BP2, and connected to the first sensing patterns SP1. Although not shown, the first conductive layer BML according to an embodiment of the inventive concept may include a lower layer, which will be described later, of the sensing lines TL1, TL2, and TL3 including a plurality of conductive layers.

The first sensing insulation layer IL1 may cover the first conductive layer BML, and a plurality of contact holes CH-T may be formed in the first sensing insulation layer IL1 to pass through the first sensing insulation layer IL-1 in the third direction DR3.

The first sensing insulation layer IL1 may include an inorganic material. The inorganic material may include at least one of a silicon oxide, a silicon nitride, a silicon oxynitride, a titanium oxide, and an aluminum oxide.

The second conductive layer UML may include first connection patterns BP1. The first connection patterns BP1 may be connected to the first sensing patterns SP1 through the contact hole CH-T in the first sensing insulation layer IL1. Although not shown, the second conductive layer UML according to an embodiment of the inventive concept may include an upper layer, which will be described later, of the sensing lines TL1, TL2, and TL3 including a plurality of conductive layers.

The second conductive layer UML may include an opaque conductive material. For example, the second conductive layer UML may include metal, e.g., molybdenum, silver, titanium, copper, aluminum, or an alloy thereof. For example, the alloy may be molybdenum niobium.

In an embodiment of the inventive concept, although four first connection patterns BP1 are exemplarily disposed to connect two first sensing patterns SP1, the embodiment of the inventive concept is not limited thereto. Each of the first connection patterns BP1 may be connected to one first sensing pattern SP1 and one floating pattern ILP. The two first sensing patterns SP1, which are spaced apart from each other, may be electrically connected to each other through the first connection patterns BP1 and the floating pattern ILP.

The second sensing insulation layer IL2 may cover the second conductive layer UML. The second sensing insulation layer IL2 may include an inorganic material, e.g., at least one of a silicon oxide, a silicon nitride, a silicon oxynitride, a titanium oxide, and an aluminum oxide.

According to an embodiment of the inventive concept, the first sensing insulation layer IL1 and the second sensing insulation layer IL2 may overlap the peripheral area NAA-I as well as the active area AA-I in FIG. 5.

Figure 7:
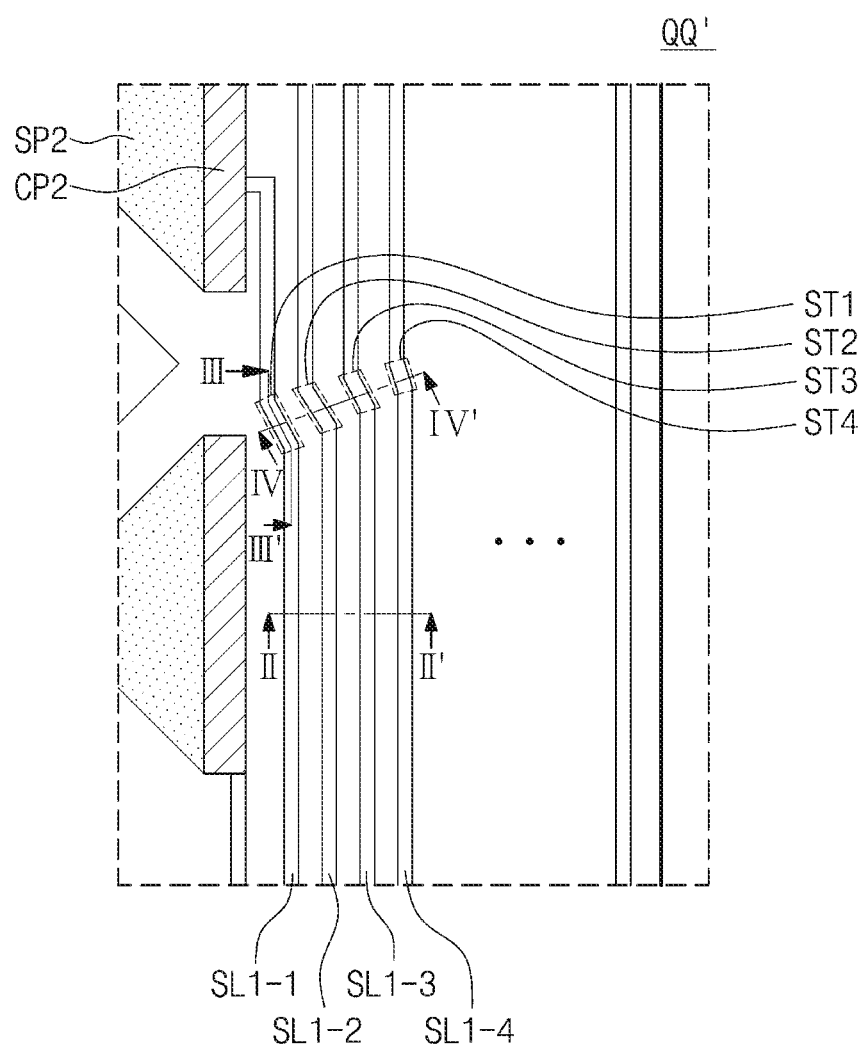
FIG. 7 is an enlarged plan view illustrating an area QQ' in FIG. 5.
Figure 8A:
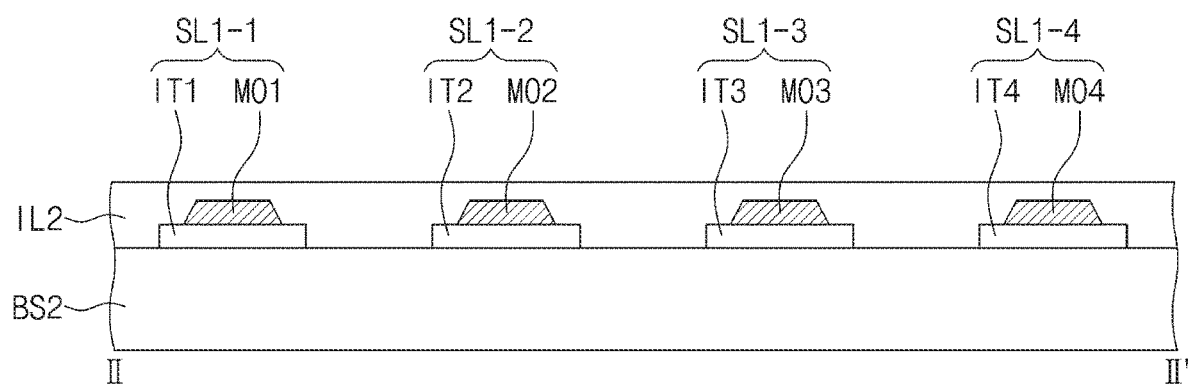
FIG. 8A is a cross-sectional view taken along line II-II' of FIG. 7.
Figure 8B:
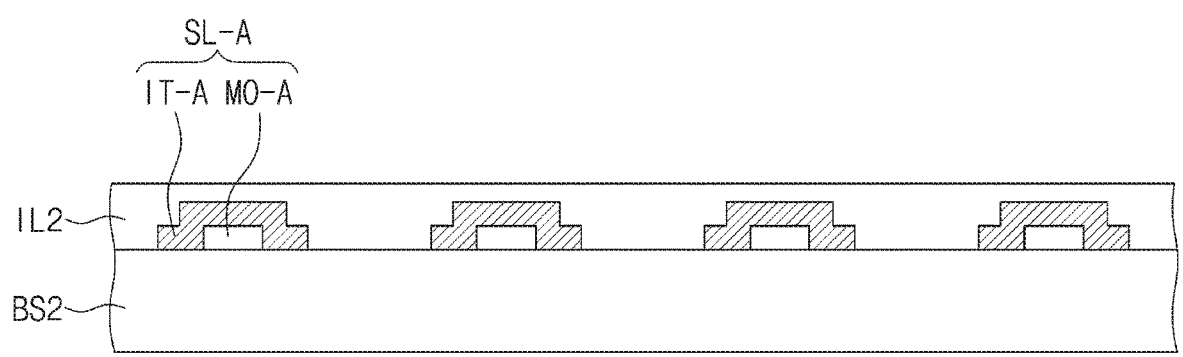
FIG. 8B is a cross-sectional view illustrating an area corresponding to FIG. 8A.
Figure 9:
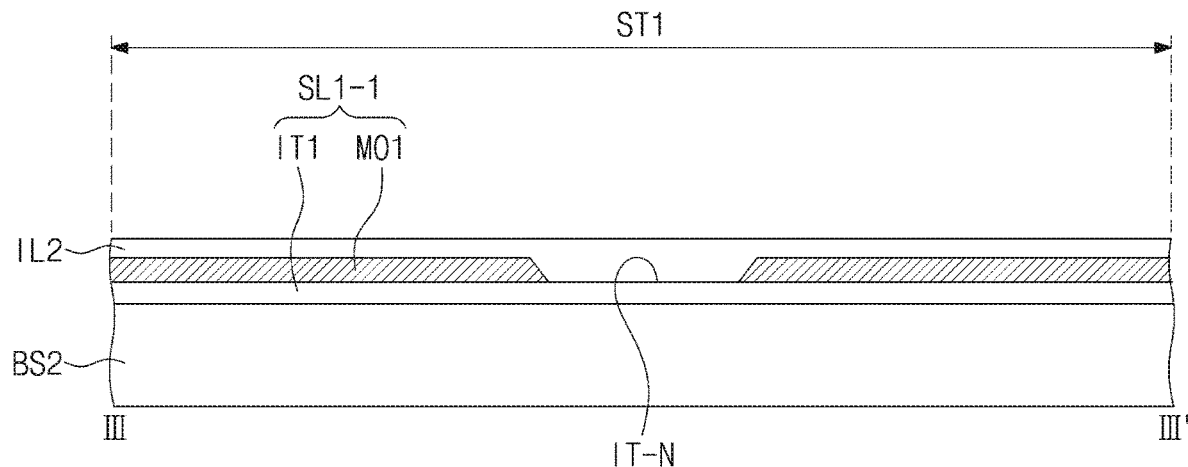
FIG. 9 is a cross-sectional view taken along line III-III' of FIG. 7.
Figure 10:
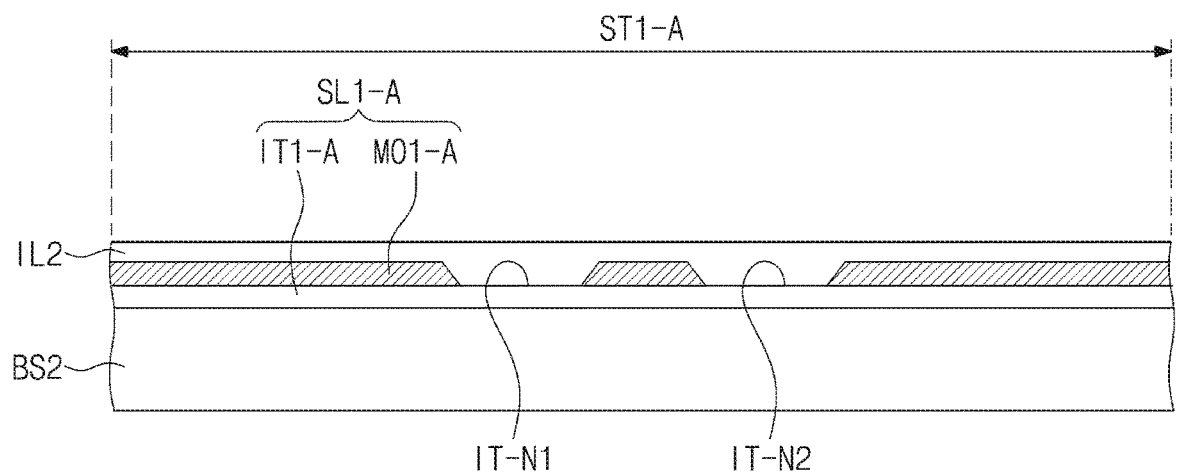
FIG. 10 is a cross-sectional view illustrating an area corresponding to FIG. 9.
Figure 11:
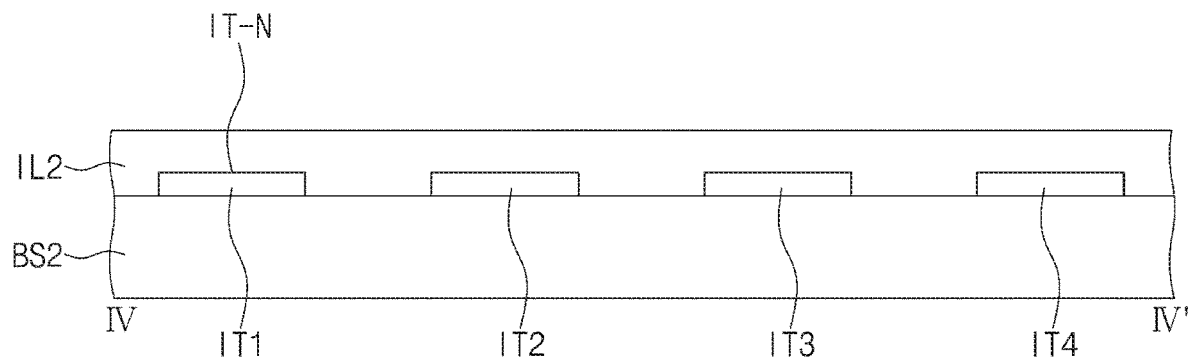
FIG. 11 is a cross-sectional view taken along line IV-IV' of FIG. 7.

FIG. 7 is an enlarged plan view illustrating an area QQ' in FIG. 5. FIG. 8A is a cross-sectional view taken along line II-II' of FIG. 7. FIG. 8B is a cross-sectional view illustrating an area corresponding to FIG. 8A. FIG. 9 is a cross-sectional view taken along line III-III' of FIG. 7. FIG. 10 is a cross-sectional view illustrating an area corresponding to FIG. 9. FIG. 11 is a cross-sectional view taken along line IV-IV of FIG. 7. The same or similar components as those in FIGS. 1 and 6B will be designated by the same or similar reference numerals, respectively, and overlapped description thereof will be omitted.

Although a portion of the first sensing lines TL1 of the sensing lines TL1, TL2, and TL3 in FIG. 5 is enlarged in FIG. 7, the embodiment of the inventive concept is not limited thereto. For example, this feature may be applied to each of the sensing lines TL1, TL2, and TL3.

Referring to FIG. 7, each of sensing lines SL1-1, SL1-2, SL1-3, and SL1-4 according to an embodiment of the inventive concept includes a diagonal portion ST1, ST2, ST3, and ST4 extending in a direction diagonal to each of the first direction DR1 and the second direction DR2. Although one diagonal portion ST1, ST2, ST3, and ST4 is contained in each of the sensing lines SL1-1, SL1-2, SL1-3, and SL1-4 in FIG. 7, the embodiment of the inventive concept is not limited thereto. For example, each of the sensing lines may include a plurality of diagonal portions.

First to fourth diagonal portions ST1, ST2, ST3, and ST4 may face a corner of one of the interconnection patterns CP1 and CP2 (refer to FIG. 5). In FIG. 7, the first to fourth diagonal portions ST1, ST2, ST3, and ST4 exemplarily face a corner of the first interconnection pattern CP1.

The diagonal portions ST1, ST2, ST3, and ST4 contained in the sensing lines SL1-1, SL1-2, SL1-3, and SL1-4, respectively, may be a structure for reducing the peripheral area NAA-I in FIG. 5. The sensing lines SL1-1, SL1-2, SL1-3, and SL1-4 may be connected to the interconnection patterns CP1 and CP2 extending from the area facing the corner of the first interconnection pattern CP1 in the direction diagonal to each of the first direction DR1 and the second direction DR2 in a corresponding manner in order to reduce an unnecessary area of the sensing lines SL1-1, SL1-2, SL1-3, and SL1-4.

According to the embodiment, in the diagonal direction, a length of each of the diagonal portions ST1, ST2, ST3, and ST4 may decrease in a direction away from the first sensing pattern SP1. Thus, the sensing line disposed at an outermost portion may have a linear shape extending in the first direction DR1. However, this is merely an example. Although the sensing line disposed at the outermost portion may include the diagonal portion having a width less than that of each of the diagonal portions ST1, ST2, ST3, and ST4, the embodiment of the inventive concept is not limited thereto.

FIGS. 8A and 8B are cross-sectional views illustrating an area of the sensing lines SL1-1, SL1-2, SL1-3, and SL1-4 except for the first to fourth diagonal portions ST1, ST2, ST3, and ST4.

Referring to FIG. 8A which is a cross-sectional view taken along line I-I' of FIG. 7, the sensing lines SL1-1, SL1-2, SL1-3, and SL1-4 include a lower layer IT1, IT2, IT3, and IT4 and an upper layer MO1, MO2, MO3, and MO4 which are disposed on the second base layer BS2. According to the embodiment, the upper layer MO1, MO2, MO3, and MO4 may contact the lower layer IT1, IT2, IT3, and IT4.

The lower layer IT1, IT2, IT3, and IT4 may be contained in the first conductive layer BML described in FIGS. 6A and 6B. Thus, the lower layer IT1, IT2, IT3, and IT4 may include a transparent conductive oxide, e.g., at least one of an indium-zinc-oxide (IZO), an indium-tin oxide (ITO), an indium-gallium oxide (IGO), an indium-zinc-gallium oxide (IGZO), and a mixture/compound thereof. However, the embodiment of the inventive concept is not limited thereto.

The upper layer MO1, MO2, MO3, and MO4 may be contained in the second conductive layer UML described in FIGS. 6A and 6B. Thus, the upper layer MO1, MO2, MO3, and MO4 may include metal, e.g., molybdenum, silver, titanium, copper, aluminum, or an alloy thereof. For example, the alloy may be molybdenum niobium.

In the embodiment, the upper layer MO1, MO2, MO3, and MO4 may expose a portion of the lower layer IT1, IT2, IT3, and IT4. For example, an area of the lower layer IT1, IT2, IT3, and IT4, which is not in overlap with the upper layer MO1, MO2, MO3, and MO4, may be exposed from the upper layer MO1, MO2, MO3, and MO4 and contact the second sensing insulation layer IL2.

According to the embodiment, the upper layer MO1, MO2, MO3, and MO4, which has relatively great ionization tendency, may react with moisture and oxygen, which are introduced from the outside, faster than the lower layer IT1, IT2, IT3, and IT4. Thus, as the upper layer MO1, MO2, MO3, and MO4 is firstly corroded, the lower layer IT1, IT2, IT3, and IT4 may not be corroded by the upper layer MO1, MO2, MO3, and MO4.

Referring to FIG. 8B which is a cross-sectional view illustrating an area corresponding to FIG. 8A, an upper layer IT-A may completely cover a lower layer MO-A. According to the embodiment, as the upper layer IT-A has a cross-section greater than that of the lower layer MO-A, the upper layer IT-A may further effectively protect the lower layer MO-A from moisture and oxygen introduced from the outside.

FIGS. 9 and 10 are cross-sectional views obtained by cutting an area of the first sensing line SL1-1, which overlaps the first diagonal portion ST1, in a diagonal direction.

Referring to FIG. 9 which is a cross-sectional view taken along line III-III' of FIG. 7, the upper layer MO1 of the first sensing line SL1-1 in the first diagonal portion ST1 is removed and exposes one portion IT-N of the lower layer IT1. Thus, although moisture and oxygen introduced from the outside corrode the upper layer MO1, since the upper layer MO1 is disconnected in the first diagonal portion ST1, the upper layer MO1 may be prevented from being corroded further than a predetermined area. Thus, the input sensing panel ISP having improved reliability may be provided.

Referring to FIG. 10 which is a cross-sectional view illustrating an area corresponding to FIG. 9, an upper layer MO1-A of a first sensing line SL1-A in a first diagonal portion ST1-A is disconnected in the diagonal direction to expose portions IT-N1 and IT-N2 of a lower layer IT1-A. According to the embodiment, the portion of the lower layer IT1-A exposed by the upper layer MO1-A may be provided in plurality. For example, the lower layer IT1-A may include a first portion IT-N1 and a second portion IT-N2 spaced apart from the first portion IT-N1.

FIG. 11 is a cross-sectional view taken along line IV-IV' of FIG. 7 of the diagonal portions ST1, ST2, ST3, and ST4 of the sensing lines SL1-1, SL1-2, SL1-3, and SL1-4.

According to the embodiment, when the area overlapping the respective diagonal portions ST1, ST2, ST3, and ST4 of the sensing lines SL1-1, SL1-2, SL1-3, and SL1-4 is cut in a direction crossing the diagonal direction, one portion IT-N of the lower layer IT1, IT2, IT3, and IT4 of each of the sensing lines SL1-1, SL1-2, SL1-3, and SL1-4 may be exposed and directly covered by the second sensing insulation layer IL2.

Figure 12:
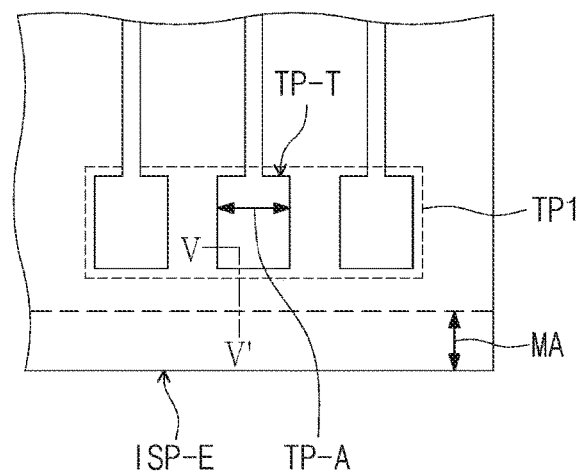
FIG. 12 is an enlarged plan view illustrating one area of the input sensing panel according to an embodiment of the inventive concept.
Figure 13:
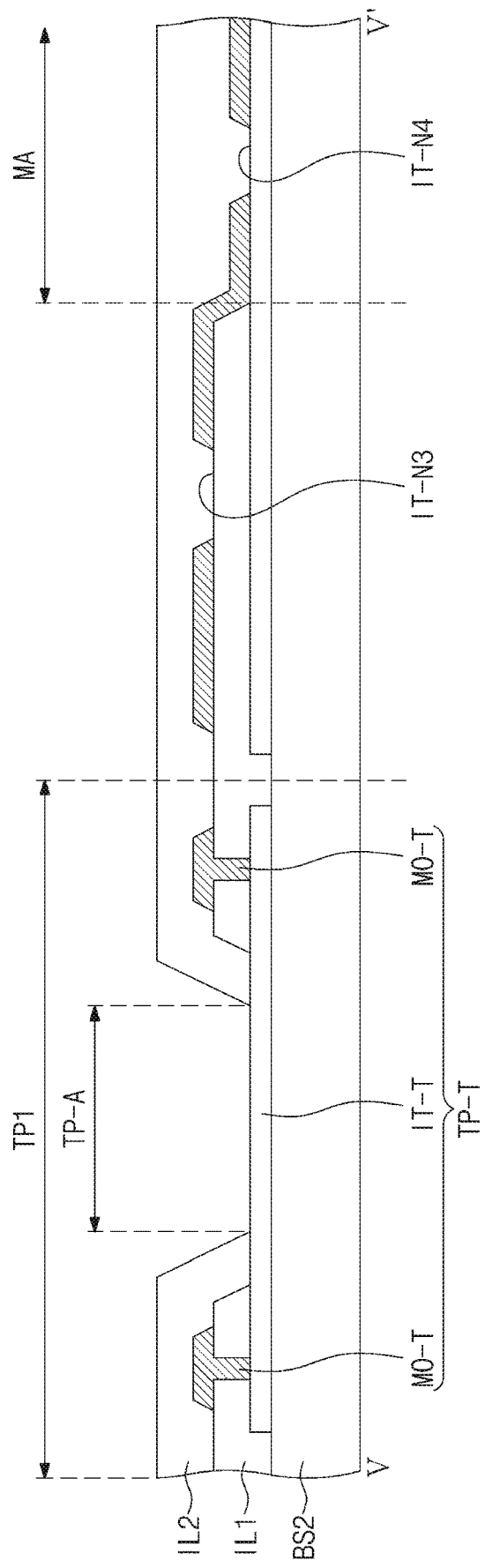
FIG. 13 is a cross-sectional view taken along line V-V' of FIG. 12.

FIG. 12 is an enlarged plan view illustrating one area of the input sensing panel according to an embodiment of the inventive concept. FIG. 13 is a cross-sectional view taken along line V-V' of FIG. 12. The same or similar components as those in FIGS. 1 to 9 will be designated by the same or similar reference numerals, respectively, and overlapped description thereof will be omitted.

FIG. 12 is an enlarged view illustrating the first sensing pad TP1 in FIG. 5.

Referring to FIGS. 12 and 13, the input sensing panel ISP (refer to FIG. 2) according to an embodiment of the inventive concept may be cut along an edge ISP-E of the input sensing panel ISP from a mother substrate (not shown) in which the plurality of input sensing panels are arranged and separated as the individual input sensing panel ISP. The mother substrate may be cut while being spaced apart from the first sensing pads TP1 with a predetermined margin area MA from the edge ISP-E. One of the first sensing pads TP1 is illustrated as a first sensing pad TP-T.

The first sensing pad TP-T adjacent to the edge ISP-E of the input sensing panel ISP may include a lower pad IT-T disposed on the second base layer BS2 and an upper pad MO-T connected to the lower pad IT-T through contact holes defined in the first sensing insulation layer IL1 surrounding the low pad IT-T.

A pad portion TP-A connected with a pad of the first sensing pad TP-T, which is contained in the second circuit board CF2 (refer to FIG. 2), may be a portion of the lower pad IT-T, which is exposed by an opening defined in the second sensing insulation layer IL2. According to an embodiment of the inventive concept, the lower pad IT-T may be contained in the first conductive layer BML described in FIGS. 6A and 6B, and the upper pad MO-T may be contained in the second conductive layer UML.

According to an embodiment of the inventive concept, when the input sensing panel is provided, the first conductive layer BML, the first sensing insulation layer IL1, the second conductive layer UML, and the second sensing insulation layer IL2 on the second base layer BS2 may be deposited and patterned in common on the front surface of the mother substrate. Thus, when the input sensing panel ISP is individually cut from the mother substrate, a cross-section of the second conductive layer UML including a metal material may be exposed at the edge ISP-E of the input sensing panel ISP.

According to an embodiment of the inventive concept, the second conductive layer UML adjacent to the edge ISP-E may be disconnected to expose one portions IT-N3 and IT-N4 of the first conductive layer BML in order to block moisture and oxygen introduced from the edge ISP-E of the input sensing panel ISP, which is cut cross-section.

The first portion IT-N3 may be provided between the margin area MA and the first sensing pad area TP1, and the second portion IT-N4 may overlap the margin area MA. Here, one of the first portion IT-N3 and the second portion IT-N4 may be omitted.

According to the embodiment, the moisture and oxygen introduced along the edge ISP-E may block a path introduced to the first sensing pad TP-T. Thus, the input sensing panel ISP having improved reliability may be provided.

According to the embodiment of the inventive concept, the upper layer in the area overlapping the diagonal portion of the sensing line is disconnected in the diagonal direction to expose a portion of the lower layer. Thus, although the moisture and oxygen introduced from the outside corrode the upper layer, as the upper layer is disconnected in the area overlapping the diagonal portion, the upper layer may be prevented from being corroded. Thus, the input sensing panel having improved reliability may be provided.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

Hence, the real protective scope of the present invention shall be determined by the technical scope of the accompanying claims.

What is claimed is:

1. An input sensing panel comprising:
   a base layer including an active area and a peripheral area disposed adjacent to the active area;
   a plurality of sensing electrodes disposed on the base layer in the active area and arranged in a first direction and a second direction which cross each other in an insulating manner; and
   a plurality of sensing lines disposed in the peripheral area and connected to a plurality of respective sensing electrodes, at least one of the plurality of sensing lines comprising a diagonal portion extending in a direction diagonal to each of the first direction and the second direction,
   wherein each of the plurality of sensing lines comprises a lower layer disposed on the base layer and containing a first conductive material and an upper layer containing a second conductive material different from the first conductive material and contacting the lower layer, and
   wherein the upper layer disposed in the diagonal portion is disconnected in the diagonal direction to expose a portion of the lower layer.

2. The input sensing panel of claim 1, wherein the input sensing panel comprises:
   a first conductive layer comprising one portion of the plurality of sensing electrodes and the lower layer, and containing the same material as the first conductive material;
   a first sensing insulation layer covering the first conductive layer and in which a plurality of contact holes are defined; and
   a second conductive layer comprising the other portion of the plurality of sensing electrodes and the upper layer, and containing the same material as the second conductive material.

3. The input sensing panel of claim 2, wherein the first conductive material comprises a transparent conductive oxide and the second conductive material comprises metal.

4. The input sensing panel of claim 2, wherein the plurality of sensing electrodes comprise:
   a first sensing electrode comprising a plurality of first sensing patterns arranged in the first direction and a plurality of first connection patterns configured to connect the plurality of first sensing patterns; and
   a second sensing electrode comprising a plurality of second sensing patterns arranged in the second direction and a plurality of second connection patterns configured to connect the plurality of second sensing patterns,
   wherein the plurality of first sensing patterns, the plurality of second sensing patterns, and the plurality of second connection patterns are formed of the first conductive layer, and the plurality of first connection patterns are formed of the second conductive layer, and
   wherein the plurality of first connection patterns are connected to the plurality of first sensing patterns through the contact holes.

5. The input sensing panel of claim 4, wherein the first sensing electrode comprises first interconnection patterns extending from the plurality of first sensing patterns disposed adjacent to the peripheral area among the plurality of first sensing patterns and connected to a plurality of corresponding sensing lines, and
   wherein the second sensing electrode comprises second interconnection patterns extending from the plurality of second sensing patterns disposed adjacent to the peripheral area among the plurality of second sensing patterns and connected to a plurality of corresponding sensing lines.

6. The input sensing panel of claim 5, wherein the diagonal portion of each of the plurality of sensing lines faces a corner of one of the first interconnection patterns and the second interconnection patterns.

7. The input sensing panel of claim 1, wherein the upper layer disposed in the diagonal portion has a plurality of disconnected portions.

8. The input sensing panel of claim 1, wherein a length of the diagonal portion of each of the plurality of sensing lines gradually decreases in a direction away from the plurality of sensing electrodes.

9. The input sensing panel of claim 1, wherein the upper layer covers the lower layer.

10. The input sensing panel of claim 1, wherein the base layer comprises glass.

11. A display apparatus comprising:
    a display panel; and
    an input sensing panel disposed on the display panel and divided into an active area and a peripheral area adjacent to the active area,
    wherein the input sensing panel comprises:
    a base layer;
    a plurality of sensing electrodes disposed on the base layer in the active area and arranged in a first direction and a second direction which cross each other in an insulating manner; and
    a plurality of sensing lines disposed in the peripheral area and connected to a plurality of respective sensing electrodes, at least one of the plurality of sensing lines comprising a diagonal portion extending in a direction diagonal to each of the first direction and the second direction,
    wherein each of the plurality of sensing lines comprises a lower layer disposed on the base layer and containing a first conductive material, and an upper layer containing a second conductive material different from the first conductive material and contacting the lower layer, and
    wherein the upper layer disposed in the diagonal portion is disconnected in the diagonal direction to expose a portion of the lower layer.

12. The display apparatus of claim 11, wherein the input sensing panel comprises:
    a first conductive layer comprising one portion of the plurality of sensing electrodes and the lower layer and containing the same material as the first conductive material;
    a first sensing insulation layer covering the first conductive layer and in which a plurality of contact holes are defined; and a second conductive layer comprising the other portion of the plurality of sensing electrodes and the upper layer and containing the same material as the second conductive material.

13. The display apparatus of claim 12, wherein the first conductive material comprises a transparent conductive oxide and the second conductive material comprises metal.

14. The display apparatus of claim 12, wherein the plurality of sensing electrodes comprise:
a first sensing electrode comprising a plurality of first sensing patterns arranged in the first direction and a plurality of first connection patterns configured to connect the plurality of sensing patterns; and
a second sensing electrode comprising a plurality of second sensing patterns arranged in the second direction and a plurality of second connection patterns configured to connect the plurality of sensing patterns,
wherein the plurality of first sensing patterns, the plurality of second sensing patterns, and the plurality of second connection patterns are formed of the first conductive layer, and the plurality of first connection patterns are formed of the second conductive layer, and
wherein the plurality of first connection patterns are connected to the plurality of first sensing patterns through the contact holes.

15. The display apparatus of claim 14, wherein the first sensing electrode comprises first interconnection patterns extending from the plurality of first sensing patterns disposed adjacent to the peripheral area among the plurality of first sensing patterns and connected to a plurality of corresponding sensing lines, and
wherein the second sensing electrode comprises second interconnection patterns extending from the plurality of second sensing patterns disposed adjacent to the peripheral area among the plurality of second sensing patterns and connected to a plurality of corresponding sensing lines.

16. The display apparatus of claim 15, wherein the diagonal portion of each of the plurality of sensing lines faces a corner of one of the first interconnection patterns and the second interconnection patterns.

17. The display apparatus of claim 11, wherein the upper layer disposed in the diagonal portion has a plurality of disconnected portions.

18. The display apparatus of claim 11, wherein a length of the diagonal portion of each of the plurality of sensing lines gradually decreases in a direction away from the plurality of sensing electrodes.

19. The display apparatus of claim 11, wherein the upper layer covers the lower layer.

20. The display apparatus of claim 11, wherein the base layer comprises glass.

* * * * *